(12) United States Patent
Zhang et al.

(10) Patent No.: US 8,719,259 B1
(45) Date of Patent: May 6, 2014

(54) PROVIDING CONTENT BASED ON GEOGRAPHIC AREA

(75) Inventors: Yu Zhang, Mountain View, CA (US); Amin Charaniya, Santa Clara, CA (US); Smita Hashim, Saratoga, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/586,116

(22) Filed: Aug. 15, 2012

(51) Int. Cl.
*G06F 7/00* (2006.01)
*G07F 17/30* (2006.01)

(52) U.S. Cl.
USPC .......................................................... 707/722

(58) Field of Classification Search
None
See application file for complete search history.

(56) References Cited

U.S. PATENT DOCUMENTS

| | | | |
|---|---|---|---|
| 7,774,348 B2 * | 8/2010 | Delli Santi et al. | 707/748 |
| 7,805,450 B2 | 9/2010 | Delli Santi et al. | |
| 8,001,004 B2 * | 8/2011 | Protheroe et al. | 705/14.69 |
| 8,145,521 B2 * | 3/2012 | Sah et al. | 705/14.49 |
| 2006/0271438 A1 | 11/2006 | Shotland et al. | |
| 2008/0109277 A1 | 5/2008 | Hengel | |
| 2008/0268876 A1 * | 10/2008 | Gelfand et al. | 455/457 |
| 2009/0138445 A1 * | 5/2009 | White et al. | 707/3 |
| 2009/0210316 A1 * | 8/2009 | Chu et al. | 705/26 |
| 2010/0017289 A1 * | 1/2010 | Sah et al. | 705/14.49 |
| 2010/0017398 A1 * | 1/2010 | Gupta et al. | 707/5 |
| 2010/0070342 A1 * | 3/2010 | Hu et al. | 705/10 |
| 2010/0324993 A1 * | 12/2010 | Kacholia et al. | 705/14.54 |
| 2011/0143731 A1 | 6/2011 | Ramer et al. | |
| 2011/0252064 A1 * | 10/2011 | Murugappan | 707/780 |
| 2012/0096490 A1 * | 4/2012 | Barnes, Jr. | 725/34 |
| 2012/0284118 A1 * | 11/2012 | Mamich et al. | 705/14.52 |
| 2012/0310729 A1 * | 12/2012 | Dalto et al. | 705/14.43 |
| 2013/0073473 A1 * | 3/2013 | Heath | 705/319 |

* cited by examiner

*Primary Examiner* — Robert Beausoliel, Jr.
*Assistant Examiner* — Nicholas Allen
(74) *Attorney, Agent, or Firm* — Fish & Ricardson P.C.

(57) ABSTRACT

Described are example processes for providing content based on a size of a geographic area associated with the content. The example processes may include the following operations: determining, based at least in part on bids provided in an auction, candidate content items for output in response to an input query; obtaining geographic areas associated with the candidate content items; selecting a candidate content item having a smallest geographic area; and outputting the selected candidate content item in response to the input query.

20 Claims, 3 Drawing Sheets

PROVIDING CONTENT BASED ON GEOGRAPHIC AREA

BACKGROUND

This disclosure relates generally to providing content based on a size of a geographic area associated with the content.

The Internet provides access to a wide variety of resources. For example, video, audio, and Web pages are accessible over the Internet. These resources present opportunities for other content (e.g., advertisements) to be provided with the resources. For example, a Web page can include slots in which advertisements can be presented. In another example, television programming can include slots in which advertisements can be presented.

Slots can be allocated to content providers (e.g., advertisers). An auction can be performed for the right to present advertising in a slot. In the auction, content providers provide bids specifying amounts that the content providers are willing to pay for presentation of their content.

Content providers may use geography, keywords, or a combination thereof to affect which content is provided through an auction. For example, a content provider may specify that certain content is to be provided to a particular geographic area. For example, a food delivery service may specify that their advertisements be limited to a geographic area (e.g., a town) covered by their service. In other examples, content providers may associate keywords with their content, and limit their content to output when an input matches one or more of those keywords. In some examples, both geography and keywords may be used to determine which content will become the subject of an auction.

SUMMARY

Described herein are example processes for providing content based on a size of a geographic area associated with the content. In some example processes, the following operations are performed: receiving an input query from a computing device; comparing words in the input query to keywords, where the keywords are associated with content items that can be provided to computing devices; generating, based on the comparing, matching scores indicating how well the input query matches keywords for different content items; and including, in an auction, content items having matching scores that exceed a threshold, where the auction includes operations for receiving bids from content providers to determine which of the content items in the auction to output in response to the input query. The example processes may also include the following operations: determining, based at least in part on bids provided in the auction, candidate content items for output in response to the input query; obtaining geographic areas associated with the candidate content items; selecting a candidate content item having a smallest geographic area; and outputting the selected candidate content item in response to the input query. The example processes may include one or more of the following features, either alone or in combination.

The operations performed by the example processes may include identifying a geographic area associated with the input query; and determining which content items having matching scores that exceed the threshold are also associated with geographic areas that correspond to the geographic area associated with the input query. The content items included in the auction may have matching scores that exceed the threshold and may also be associated with geographic areas that correspond to the geographic area associated with the input query. Matching scores of the candidate content items may be within a predefined tolerance of each other, and bids associated with the candidate content items may be within a predefined tolerance of each other. At least one of the following may be true: matching scores of the candidate content items are equal, and bids associated with the candidate content items are equal.

A geographic area of a first candidate content item may be larger than the geographic area of a second candidate content item. The second candidate content item may be the selected candidate. The content items may include advertising and the input query is received from a search engine.

Obtaining the geographic areas may include retrieving the geographic areas from a database, and/or calculating the geographic areas. Geographic area may be measured in terms of area size.

Two or more of the features described in this disclosure/specification, including this summary section, can be combined to form implementations not specifically described herein.

The systems and techniques described herein, or portions thereof, can be implemented as a computer program product that includes instructions that are stored on one or more non-transitory machine-readable storage media, and that are executable on one or more processing devices. The systems and techniques described herein, or portions thereof, can be implemented as an apparatus, method, or electronic system that can include one or more processing devices and memory to store executable instructions to implement the stated operations.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
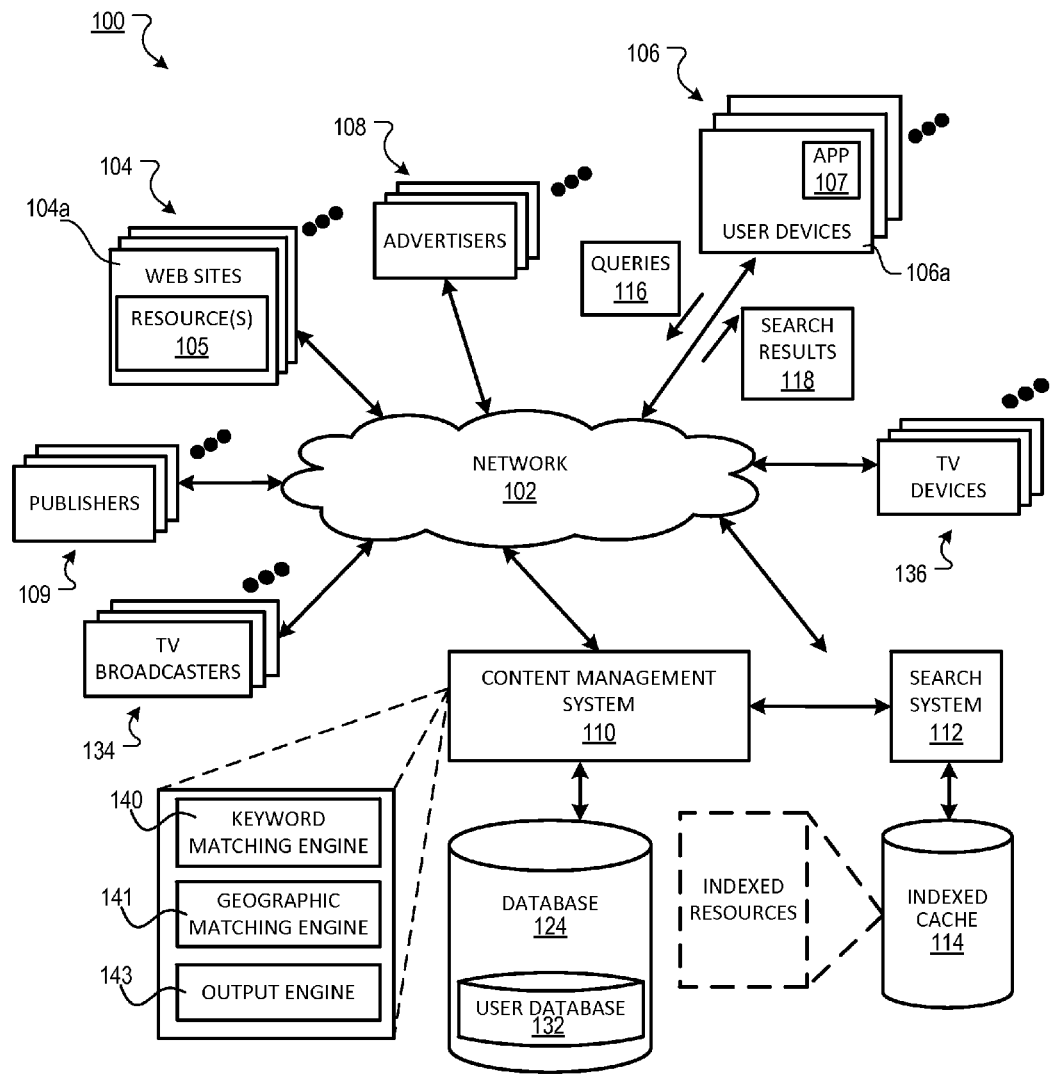
FIG. 1 is a block diagram of an example network environment on which the example processes described herein can be implemented.

Described herein are example systems for providing content based on a size of a geographic area associated with the content. Example systems of this type may use geographic area as a determinative factor in deciding which content to provide. For example, a user may submit a query, such as a search query, to a content management system. The content management system may use information from the search query to identify content, such as advertisements ("ads"), to output for inclusion with a response to the search query. For example, keywords may be associated with content. The content management system may identify content items associated with keywords that match keywords in the search query. Numerous content items may be identified based on a keyword match.

In other examples, content may be associated with particular geographies. For example, content items may be associated with geographic areas, such as Mountain View or California. These geographic areas may be used to identify content items for output. For example, the content management system may identify a geographic area, such as "Mountain View, Calif.", associated with an input query. Accordingly, the content management system may identify the content items associated with Mountain View and California as candidates for output. Numerous content items may be identified.

As a result of determinations such as those described above, there may be numerous candidate content items for inclusion with a response to the search query. An auction may be used in deciding which of these candidates to output. In some examples, the auction process may include making the foregoing determinations as part of the auction. The auction may be conducted, e.g., by the content management system. For example, the content management system may receive bids from content providers to output their respective content. These bids may be used in deciding which content to output.

In some situations, however, two or more candidate content items may be equally appropriate for output. For example, two content items may have bids that are equal (or within a specified tolerance), keyword matching scores that are equal (or within a specified tolerance) and/or geographic matches that are equal (or within a specified tolerance). Other factors, including, but not limited to, click-through ratio, may also be the same or about the same between two content items. In such situations, the size of the geographic areas may be used to determine which of the content items to output. For example, the size of the geographic area associated with each content item may be determined, and the content item associated with the smallest geographic area may be selected for output. In the above example, this would mean that the content item associated without Mountain View would be output over the content item associated with California, since Mountain View is smaller in geographic area than California.

The example process described above can be implemented in any appropriate network environment, with any appropriate devices and computing equipment. An example of such an environment is described below.

FIG. 1 is a block diagram of an example environment 100 for providing content based on a size of a geographic area associated with the content. The example environment 100 includes a network 102.

In this example, network 102 represents a communications network that can allow devices, such as a user device 106a, to communicate with entities on the network through a communication interface (not shown), which can include digital signal processing circuitry. Network 102 can include one or more networks. The network(s) can provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), or one or more television or cable networks, among others. For example, the communication can occur through a radio-frequency transceiver. In addition, short-range communication can occur, such as using a Bluetooth, WiFi, or other such transceiver.

Network 102 connects various entities, such as Web sites 104, user devices 106, content providers (e.g., advertisers 108), online publishers 109, and a content management system 110. In this regard, example environment 100 can include many thousands of Web sites 104, user devices 106, and content providers (e.g., advertisers 108). Entities connected to network 102 include and/or connect through one or more servers. Each such server can be one or more of various forms of servers, such as a Web server, an application server, a proxy server, a network server, or a server farm. Each server can include one or more processing devices, memory, and a storage system.

In FIG. 1, Web sites 104 can include one or more resources 105 associated with a domain name and hosted by one or more servers. An example Web site 104a is a collection of Web pages formatted in hypertext markup language (HTML) that can contain text, images, multimedia content, and programming elements, such as scripts. Each Web site 104 can be maintained by a publisher 109, which is an entity that controls, manages and/or owns the Web site 104.

A resource 105 can be any appropriate data that can be provided over network 102. A resource 105 can be identified by a resource address that is associated with the resource 105. Resources 105 can include HTML pages, word processing documents, portable document format (PDF) documents, images, video, and news feed sources, to name a few. Resources 105 can include content, such as words, phrases, images and sounds, that can include embedded information (such as meta-information hyperlinks) and/or embedded instructions (such as JavaScript scripts).

To facilitate searching of resources 105, environment 100 can include a search system 112 that identifies the resources 105 by crawling and indexing the resources 105 provided by the content publishers on the Web sites 104. Data about the resources 105 can be indexed based on the resource 105 to which the data corresponds. The indexed and, optionally, cached copies of the resources 105 can be stored in an indexed cache 114.

An example user device 106a is an electronic device that is under control of a user and that is capable of requesting and receiving resources over the network 102. A user device can include one or more processing devices, and can be, or include, a mobile telephone (e.g., a smartphone), a laptop computer, a handheld computer, an interactive or so-called "smart" television or set-top box, a tablet computer, a network appliance, a camera, an enhanced general packet radio service (EGPRS) mobile phone, a media player, a navigation device, an email device, a game console, or a combination of any two or more of these data processing devices or other data processing devices. In some implementations, the user device can be included as part of a motor vehicle (e.g., an automobile, an emergency vehicle (e.g., fire truck, ambulance), a bus).

User device 106a typically stores one or more user applications, such as a Web browser, to facilitate the sending and receiving of data over the network 102. A user device 106a that is mobile (or simply, "mobile device"), such as a smartphone or a table computer, can include an application ("app") 107 that allows the user to conduct a network (e.g., Web) search. User devices 106 can also be equipped with software to communicate with a GPS system, thereby enabling the GPS system to locate the mobile device.

User device 106a can request resources 105 from a Web site 104a. In turn, data representing the resource 105 can be provided to the user device 106a for presentation by the user device 106a. User devices 106 can also submit search queries 116 to the search system 112 over the network 102. A request for a resource 105 or a search query 116 sent from a user device 106 can include an identifier, such as a cookie, identifying the user of the user device.

In response to a search query 116, the search system 112 can access the indexed cache 114 to identify resources 105 that are relevant to the search query 116. The search system 112 identifies the resources 105 in the form of search results 118 and returns the search results 118 to a user device 106 in search results pages. A search result 118 can include data generated by the search system 112 that identifies a resource 105 that is responsive to a particular search query 116, and includes a link to the resource 105. An example search result 118 can include a Web page title, a snippet of text or a portion of an image extracted from the Web page, and the URL (Unified Resource Location) of the Web page.

Content management system 110 can be used for selecting and providing content in response to requests for content. Content management system 110 also can, with appropriate user permission, update database 124 based on activity of a user. In this regard, with appropriate user permission, the database 124 can store a profile for the user which includes, for example, information about past user activities, such as visits to a place or event, past requests for resources 105, past search queries 116, other requests for content, Web sites visited, or interactions with content. One or more controls may be provided to allow a user to opt-in or to opt-out of having information stored in their profile. In some implementations, the information in database 124 can be derived, for example, from one or more of a query log, an advertisement log, or requests for content. The database 124 can include, for each entry, a cookie identifying the user, a timestamp, an IP (Internet Protocol) address associated with a requesting user device 106, a type of usage, and details associated with the usage.

Content management system 110 may include a keyword matching engine 140 to compare query keywords to content keywords and to generate a keyword matching score indicative of how well the query keywords match the content keywords. In an example, the keyword matching score is equal, or proportional, to a sum of a number of matches of words in the input query to words associated with the content.

Content management system 110 may include a geographic (or "geo") matching engine 141 to compare geographic information (e.g., numerical values for place names) obtained from either words in input queries or the location of the user to geographic information associated with content. In some examples, geo-matching engine 141 detects an exact match only. In other examples, a score may be generated indicating how closely geographic information matches. For example, geographic information may be part of a geographic hierarchy, e.g., San Francisco (city), California (state), and United States (country). Geo-matching engine 141 may generate a numerical identifier for each element of the hierarchy (e.g., San Francisco, Calif., and United States) and compare those numerical identifiers to corresponding numerical identifiers represented by geographic information associated with content (where the numerical identifiers associated with the content represent, e.g., geographic place names or locations or other geographic indicia). The resulting score may correspond to how many geographic elements of the input query match corresponding geographic elements of the content.

Content management system 110 may also include an output engine 143 to determine which content to output in a particular circumstance, e.g., if two or more content items are equally (or about equally) appropriate for output.

When a resource 105 or search results 118 are requested by a user device 106, content management system 110 can receive a request for content to be provided with the resource 105 or search results 118. The request for content can include characteristics of one or more "slots" that are defined for the requested resource 105 or search results page. For example, the data representing the resource 105 can include data specifying a portion of the resource 105 or a portion of a user display, such as a presentation location of a pop-up window or a slot of a third-party content site or Web page, in which content can be presented. An example slot is an ad slot. Search results pages can also include one or more slots in which other content items (e.g., ads) can be presented.

Information about slots can be provided to content management system 110. For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data generated from and/or included in the request, content management system 110 can select candidate content that is candidate to be provided in response to the request ("candidate content items"). For example, candidate content items can include candidate ads having characteristics matching keywords and/or geographic information associated with corresponding content. In some implementations, the universe of candidate content items (e.g., ads) can be narrowed by taking into account other factors, such as previous search queries 116. For example, content items corresponding to historical search activities of the user including, e.g., search keywords used, particular content interacted with, sites visited by the user, etc. can also be used in the selection of candidate content items by the content management system 110.

Content management system 110 can select the candidate content items that are to be provided for presentation in slots of a resource 105 or search results page 118 based, at least in part, on results of an auction, such as a second price auction. For example, for candidate content items, content management system 110 can include an auction engine to receive bids from content providers (e.g., advertisers 108) and to allocate slots, based at least in part on the received bids (e.g., based on the highest bidders at the conclusion of the auction). The bids are amounts that the content providers are willing to pay for presentation (or selection) of their content with a resource 105 or search results page 118. For example, a bid can specify an amount that a content provider is willing to pay for each 1000 impressions (i.e., presentations) of a content item, referred to as a CPM bid. Alternatively, the bid can specify an amount that the content provider is willing to pay for a selection (i.e., a click-through) of the content item or a conversion following selection of the content item. The selected content item can be determined based on the bids or based on the bids of each bidder being multiplied by one or more factors, such as quality scores derived from content performance, landing page scores, and/or other factors.

In some implementations, a content provider can bid for an audience of users. For example, one or more of the publishers 109 and/or the content management system 110 can provide one or more audiences of users where each user in the audience matches one or more criteria, such as matching one or more demographics. An audience of users can be represented, for example, as a user list. User lists or other representations of audiences can be stored, for example, in a user database 132. A bid from a content provider can specify, for example, an amount that the content provider is willing to pay for each 1000 impressions (i.e., presentations) of the content item to a particular audience of users. The content management system 110 can, for example, manage the presentation of the content item to users included in a particular audience and can manage charging of the content provider for the impressions and distributing revenue to the publishers 109 based on the impressions.

In some implementations, TV (Television) broadcasters 134 produce and present television content on TV user devices 136, where the television content can be organized into one or more channels. The TV broadcasters 134 can include, along with the television content, one or more content slots in which other content (e.g., advertisements) can be presented. For example, a TV network can sell slots of advertising to advertisers in television programs that they broadcast. Some or all of the content slots can be described in terms of user audiences which represent typical users who watch content with which a respective content slot is associated. Content providers can bid, in an auction (as described above), on a content slot that is associated with particular television content.

Figure 2:
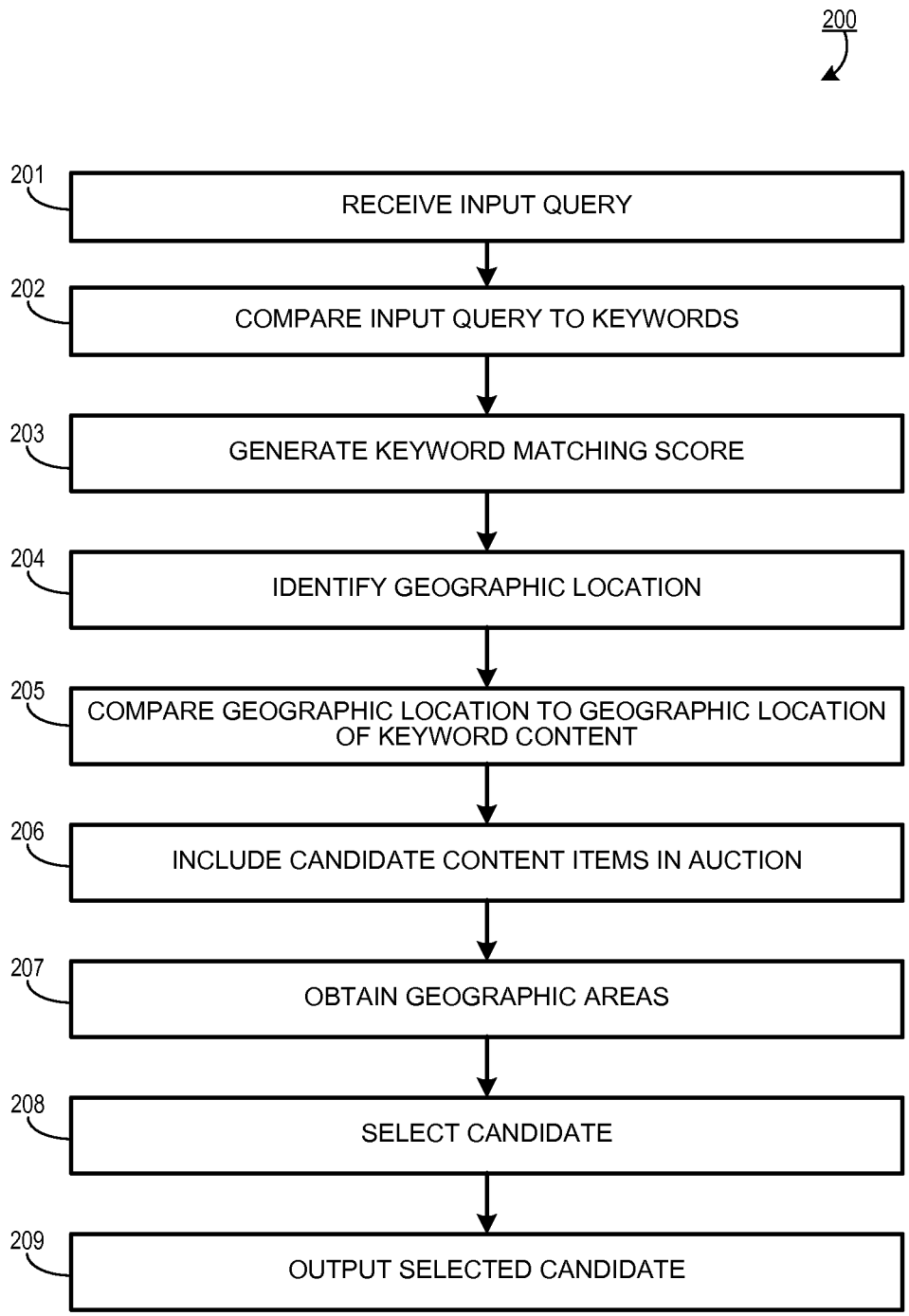
FIG. 2 is a flowchart showing an example implementation of a process for providing content based on a size of a geographic area associated with the content.

FIG. 2 is a flowchart showing a process 200 for providing content based on a size of a geographic area associated with the content. Process 200 can be performed, e.g., by executable code running in content management system 110 (FIG. 1) in connection with search system 112 or other appropriate application(s).

Referring back to FIG. 1, in this example, a content provider (e.g., an advertiser) provides content of interest based on geographic information and based on keyword data. In other words, the content provider is attempting to provide content to users who are in a particular geographic area, and is also attempting to provide content to users whose input queries appropriately match particular keywords. The particular keywords (keyword1, keyword2 . . . keywordn) and geographic information specifying the geography are associated with the content. The content may be provided through an auction, such as a second price auction. Content may be selected for inclusion in the auction based on appropriate matches of keywords and geography. In some cases, the prices of content at an auction may be influenced by how closely content keywords match query keywords, as defined by keyword matching scores and geo-matching scores.

According to process 200, an input query is received (201) from a computing device. Examples of computing devices include the user devices described above. For example, the input query may be received over an interface (not shown) to content management system 110. The input query is parsed, e.g., by keyword matching engine 140, to identify keywords in the query. Keywords in the query may be parsed based on data, such as delimiters or other information, included in the query. In this regard, the query may have been augmented by the search system 112, with other query terms, such as synonyms of the original query input by the user. These other query terms constitute part of the search query, and are treated by process 200 in the same manner as the original terms input at a computing device 106a.

Keywords from the query are compared (202) to keywords 102 associated with content that may be provided to computing devices and that is stored, e.g., in database 125, in order to identify content that is potentially relevant to the input query and thus, that may be candidates for output by the content management system. This may be done by keyword matching engine 140. A keyword matching score is generated (203) for each appropriate item of content. Each keyword matching score indicates how well the input query matches keywords associated with a corresponding content item. For example, the higher the keyword matching score is, the more closely the input query matches the keywords, and vice versa. Those items of content that have keyword matching scores greater than a threshold (e.g., greater than zero) may be candidates for output.

A geographic location may be identified (204) from the input query. For example, the input query may contain a subnet address (or other appropriate information) indicative of a geographic location. Geo-matching engine 141 may use the subnet address (or other appropriate geographic information) to search a database (e.g., in database 124) of location names to identify geographic locations (e.g., place names, zip codes, geographic coordinates, etc.) associated with the input query. Geo-matching engine 141 may generate a numerical value that represents each identified geographic location. In this example, a single geographic location is identified; however, in other examples, numerous geographic locations may be identified. The numerical value is compared (205) (e.g., by geo-matching engine 141) to geographic information associated with content for output.

In some examples, geographic information may be part of a geographic hierarchy, e.g., San Francisco (city), California (state), and United States (country), where United States is a geographic "parent" of California, and California is a geographic "parent" of San Francisco. In such examples, content may be associated with several levels of a geographic hierarchy; however, the input query may identify only one level. For example, a first content item may be associated with California and a second content item may be associated with Mountain View, Calif. The geographic information obtained from the input query, however, may only be for "Mountain View, Calif.". In this example, both the first and second content items will match the geographic information obtained from the input query and, therefore, will be candidates for output.

Candidate content items obtained from keyword matching engine 140 and/or geo-matching engine 141 are included (206) in an auction. The auction may be run by content management system 110. In this implementation, content management system 110 receives bids from content providers to output their corresponding content. The bids are used to determine which of the candidate content items are to be output for inclusion with content that is responsive to the initial query. In some cases, however, the bids associated with different content items may be the same or sufficiently close (e.g., within a specified tolerance) as not to provide a clear winner in the auction. Thus, in such cases, matching scores of the candidate content items are equal or within a predefined tolerance of each other, bids associated with the candidate content items are equal or within a predefined tolerance of each other, and/or geo-matches to the candidate content items are equal or within a predetermined tolerance. Essentially, therefore, among the candidate content items, there is no clear choice as to which content item is best to output in response to the input query. This may be referred to as a "tie".

In the case of a tie, geographic areas associated with the "tied" candidate content items are used to break the tie. In other words, the geographic areas are used to determine which of the candidate content items to output. This part of process 200 may be performed, e.g., by output engine 143. To this end, geographic areas associated with the candidate content items are obtained (207). This may be done by identifying the geographic areas from corresponding geographic information and obtaining the sizes of those areas. The sizes may be, e.g., in square kilometers, square miles, etc., and may be obtained from a database that stores such information. Alternatively, the sizes of the geographic areas may be calculated based on the dimensions of those areas. For example, the geographic areas may be specified in terms of radii or polygons. The areas may be calculated based on the size of the radius or features of the polygons.

The sizes of the geographic areas are compared to identify which of them is the smallest. The candidate content item with the smallest geographic area is selected (208) for output. In cases where there are N (N>1) slots for content items, the N candidates having the smallest geographic areas are selected. The selected candidates are output (209) for inclusion with content responsive to the input query. Content items may be output through output engine 143 (see FIG. 1) or other appropriate Web server. For example, search system 112 may receive such content and incorporate it into slots included in a search results page, which is then sent to the computing device that provided the original query.

Features in addition to, or other than, geographic area may be used in determining which content items to output in the event of a "tie". For example, the population of geographic areas associated with candidate content items may be determined, e.g., by reference to a database. The candidate content item(s) associated with geographic area(s) having the smallest or the largest population(s) may be selected for output in the event of a "tie". In other cases, a combination of geographic area size and population may be used. For example, content items associated with the smallest geographic area with the largest population may be selected. Population density may also be used as a criterion for selecting content items for output. For example, a content item with a geographic area having the smallest area and/or the highest population density may be output. Other features not explicitly described herein may also be used.

Figure 3:
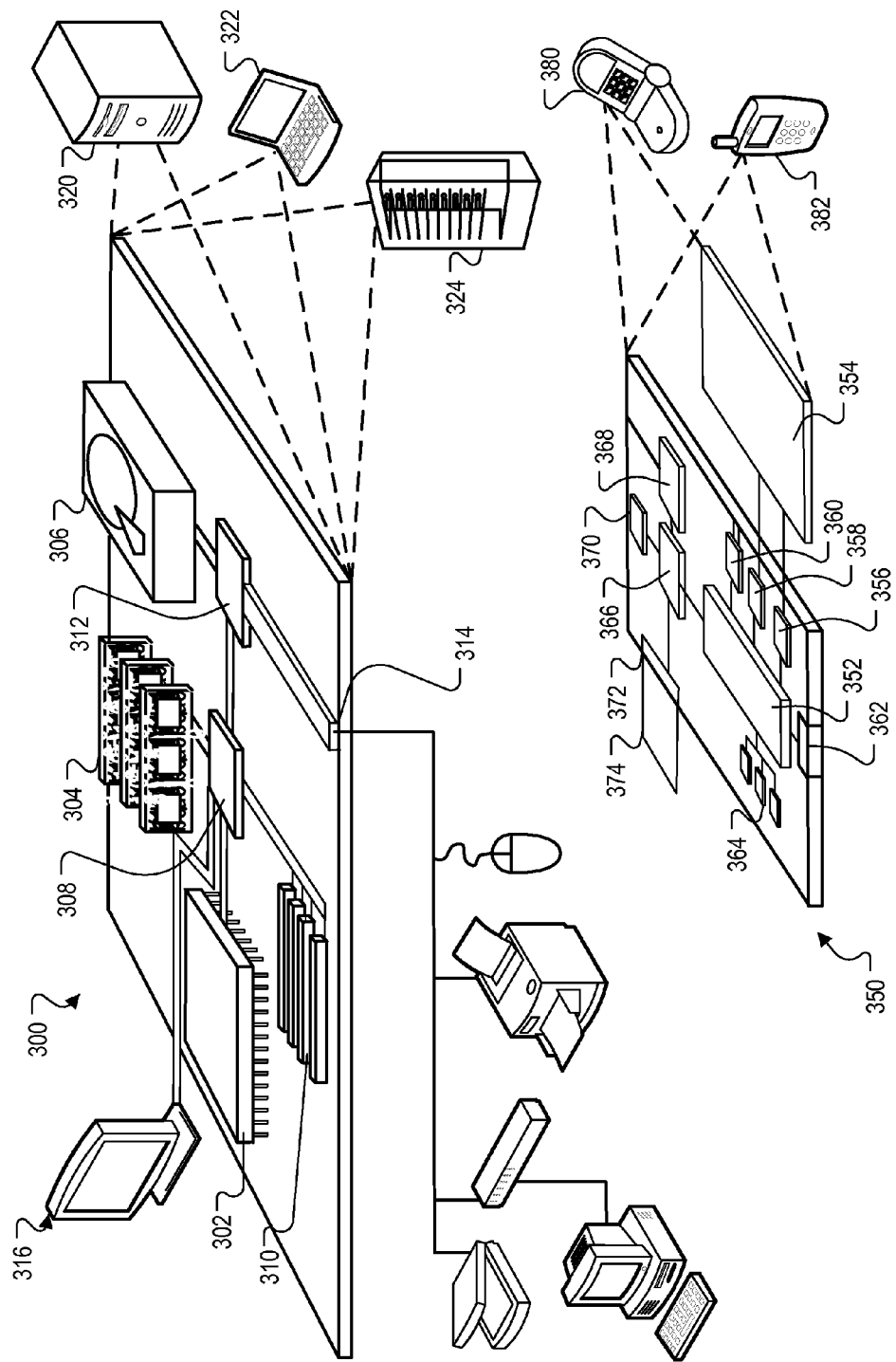
FIG. 3 shows examples of computing devices on which the processes described herein, or portions thereof, can be implemented.

FIG. 3 shows an example of a generic computing device 300 and a generic mobile computing device 350, which can be used to implement all or part of the processes described herein. For example, the content management system 110 and the search system 112 can be implemented by computing device 300 and mobile computing device 350 can implement a user device 106 of FIG. 1. Computing device 300 is intended to represent various forms of digital computers, e.g., laptops, desktops, workstations, personal digital assistants, servers, blade servers, mainframes, and other appropriate computers. Computing device 350 is intended to represent various forms of mobile devices, e.g., personal digital assistants, cellular telephones, smartphones, and other similar computing devices. The components shown here, their connections and relationships, and their functions, are meant to be examples, and are not meant to limit implementations of the inventions described and/or claimed in this document.

Computing device 300 is intended to represent various forms of digital computers, examples of which include laptops, desktops, workstations, personal digital assistants, servers, blade servers, mainframes, and other appropriate computers. Computing device 350 is intended to represent various forms of mobile devices, examples of which include personal digital assistants, cellular telephones, smartphones, and other similar computing devices. The components shown here, their connections and relationships, and their functions, are meant to be examples, and are not meant to limit the scope of the appended claims.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and can be mounted on a common motherboard or in other manners as appropriate. The processor 302 can process instructions for execution within the computing device 300, including instructions stored in the memory 304 or on the storage device 306 to display graphical information for a GUI on an external input/output device, for example, display 316 coupled to high speed interface 308. In other implementations, multiple processors and/or multiple buses can be used, as appropriate, along with multiple memories and types of memory. Also, multiple computing devices 300 can be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 can also be another form of computer-readable medium, examples of which include a magnetic or optical disk.

The storage device 306 is capable of providing mass storage for the computing device 300. In one implementation, the storage device 306 can be or contain a computer-readable medium, for example, a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, including those described above. The information carrier can be a non-transitory computer- or machine-readable medium, for example, the memory 304, or the storage device 306, memory on processor 302. For example, the information carrier can be a non-transitory, machine-readable storage medium.

The high speed controller 308 manages bandwidth-intensive operations for the computing device 300, while the low speed controller 312 manages lower bandwidth-intensive operations. Such allocation of functions is an example. In one implementation, the high-speed controller 308 is coupled to memory 304, display 316 (e.g., through a graphics processor or accelerator), and to high-speed expansion ports 310, which can accept various expansion cards (not shown). In the implementation, low-speed controller 312 is coupled to storage device 306 and low-speed expansion port 314. The low-speed expansion port, which can include various communication ports (e.g., USB, Bluetooth, Ethernet, wireless Ethernet) can be coupled to one or more input/output devices, examples of which include a keyboard, a pointing device, a scanner, or a networking device, for example, a switch or router, e.g., through a network adapter.

The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer, for example, a laptop computer 322. Alternatively, components from computing device 300 can be combined with other components in a mobile device (not shown), for example, device 350. Each of such devices can contain one or more of computing device 300, 350, and an entire system can be made up of multiple computing devices 300, 350 communicating with each other.

Computing device 350 includes a processor 352, memory 364, an input/output device for example, a display 354, a communication interface 366, and a transceiver 368, among other components. The device 350 can also be provided with a storage device, for example, a microdrive or other device, to provide additional storage. Each of the components 350, 352, 364, 354, 366, and 368, are interconnected using various buses, and several of the components can be mounted on a common motherboard or in other manners as appropriate.

The processor 352 can execute instructions within the computing device 350, including instructions stored in the memory 364. The processor can be implemented as a chipset of chips that include separate and multiple analog and digital processors. The processor can provide, for example, for coordination of the other components of the device 350, for example, control of user interfaces, applications run by device 350, and wireless communication by device 350.

Processor 352 can communicate with a user through control interface 358 and display interface 356 coupled to a display 354. The display 354 can be, for example, a TFT LCD (Thin-Film-Transistor Liquid Crystal Display) or an OLED (Organic Light Emitting Diode) display, or other appropriate display technology. The display interface 356 can comprise appropriate circuitry for driving the display 354 to present graphical and other information to a user. The control interface 358 can receive commands from a user and convert them for submission to the processor 352. In addition, an external interface 362 can be provided in communication with processor 352, so as to enable near area communication of device 350 with other devices. External interface 362 can provide, for example, for wired communication in some implementations, or for wireless communication in other implementations, and multiple interfaces can also be used.

The memory 364 stores information within the computing device 350. The memory 364 can be implemented as one or more of a computer-readable medium or media, a volatile memory unit or units, or a non-volatile memory unit or units. Expansion memory 374 can also be provided and connected to device 350 through expansion interface 372, which can include, for example, a SIMM (Single In Line Memory Module) card interface. Such expansion memory 374 can provide extra storage space for device 350, or can also store applications or other information for device 350. Specifically, expansion memory 374 can include instructions to carry out or supplement the processes described above, and can include secure information also. Thus, for example, expansion memory 374 can be provided as a security module for device 350, and can be programmed with instructions that permit secure use of device 350. In addition, secure applications can be provided by the SIMM cards, along with additional information, for example, placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, examples of which include those described above. The information carrier is a computer- or machine-readable medium, for example, the memory 364, expansion memory 374, memory on processor 352, or a propagated signal that can be received, for example, over transceiver 368 or external interface 362.

Device 350 can communicate wirelessly through communication interface 366, which can include digital signal processing circuitry where necessary. Communication interface 366 can provide for communications under various modes or protocols, examples of which include GSM voice calls, SMS, EMS, or MMS messaging, CDMA, TDMA, PDC, WCDMA, CDMA2000, or GPRS, among others. Such communication can occur, for example, through radio-frequency transceiver 368. In addition, short-range communication can occur, for example, using a Bluetooth, Wi-Fi, or other such transceiver (not shown). In addition, GPS (Global Positioning System) receiver module 370 can provide additional navigation- and location-related wireless data to device 350, which can be used as appropriate by applications running on device 350.

Device 350 can also communicate audibly using audio codec 360, which can receive spoken information from a user and convert it to usable digital information. Audio codec 360 can likewise generate audible sound for a user, for example, through a speaker, e.g., in a handset of device 350. Such sound can include sound from voice telephone calls, can include recorded sound (e.g., voice messages, music files, etc.) and can also include sound generated by applications operating on device 350.

The computing device 350 can be implemented in a number of different forms, as shown in the figure. For example, it can be implemented as a cellular telephone 380. It can also be implemented as part of a smartphone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating monetizable parameters (e.g., monetizable demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Elements of different implementations described herein can be combined to form other implementations not specifically set forth above. Elements can be left out of the processes, computer programs, Web pages, etc. described herein without adversely affecting their operation. In addition, the logic flows depicted in the figures do not require the particular order shown, or sequential order, to achieve desirable results. Various separate elements can be combined into one or more individual elements to perform the functions described herein.

Other implementations not specifically described herein are also within the scope of the following claims.

What is claimed is:

1. A method comprising:
   receiving an input query from a computing device;
   comparing words in the input query to keywords, the keywords being associated with content items that can be provided to computing devices;
   generating, based on the comparing, matching scores indicating how well the input query matches keywords for different content items;
   obtaining geographies associated with the computing device and associated with the content items that can be provided to computing devices;
   identifying geographic matches between the computing device and at least some of the content items;
   including, in an auction, content items having matching scores that exceed a threshold and that match a geography of the computing device, the auction for receiving bids from content providers to determine which of the content items in the auction to output in response to the input query;
   determining, based at least in part on bids provided in the auction, candidate content items for output in response to the input query;
   obtaining geographic areas associated with the candidate content items;
   selecting a candidate content item having a smallest geographic area; and
   outputting the selected candidate content item in response to the input query.

2. The method of claim 1, wherein matching scores of the candidate content items are within a predefined tolerance of each other, and bids associated with the candidate content items are within a predefined tolerance of each other.

3. The method of claim 1, wherein at least one of the following is true: matching scores of the candidate content items are equal, and bids associated with the candidate content items are equal.

4. The method of claim 1, wherein a geographic area of a first candidate content item is larger than the geographic area of a second candidate content item, the second candidate content item being the selected candidate.

5. The method of claim 1, wherein the content items comprise advertising and the input query is received from a search engine.

6. The method of claim 1, wherein obtaining the geographic areas comprises retrieving the geographic areas from a database.

7. The method of claim 1, wherein obtaining the geographic areas comprises calculating the geographic areas.

8. The method of claim 1, wherein geographic area is measured in terms of area size.

9. One or more non-transitory machine-readable storage media storing instructions that are executable by one or more processing devices to perform operations comprising:
   receiving an input query from a computing device;
   comparing words in the input query to keywords, the keywords being associated with content items that can be provided to computing devices;
   generating, based on the comparing, matching scores indicating how well the input query matches keywords for different content items;
   obtaining geographies associated with the computing device and associated with the content items that can be provided to computing devices;
   identifying geographic matches between the computing device and at least some of the content items;
   including, in an auction, content items having matching scores that exceed a threshold and that match a geography of the computing device, the auction for receiving bids from content providers to determine which of the content items in the auction to output in response to the input query;
   determining, based at least in part on bids provided in the auction, candidate content items for output in response to the input query;
   obtaining geographic areas associated with the candidate content items;
   selecting a candidate content item having a smallest geographic area; and
   outputting the selected candidate content item in response to the input query.

10. The one or more non-transitory machine-readable storage media of claim 9, wherein matching scores of the candidate content items are within a predefined tolerance of each other, and bids associated with the candidate content items are within a predefined tolerance of each other.

11. The one or more non-transitory machine-readable storage media of claim 9, wherein at least one of the following is true: matching scores of the candidate content items are equal, and bids associated with the candidate content items are equal.

12. The one or more non-transitory machine-readable storage media of claim 9, wherein a geographic area of a first candidate content item is larger than the geographic area of a second candidate content item, the second candidate content item being the selected candidate.

13. The one or more non-transitory machine-readable storage media of claim 9, wherein the content items comprise advertising and the input query is received from a search engine.

14. The one or more non-transitory machine-readable storage media of claim 9, wherein obtaining the geographic areas comprises retrieving the geographic areas from a database.

15. The one or more non-transitory machine-readable storage media of claim 9, wherein obtaining the geographic areas comprises calculating the geographic areas.

16. The one or more non-transitory machine-readable storage media of claim 9, wherein geographic area is measured in terms of area size.

17. A system comprising:
  computer memory storing instructions that are executable; and
  one or more processing devices to execute the instructions to implement a keyword matching engine, an auction engine, and a geographic matching engine;
  the keyword matching engine to perform operations comprising:
    comparing words in an input query received from a computing device to keywords, the keywords being associated with content items that can be provided to computing devices; and
    generating, based on the comparing, matching scores indicating how well the input query matches keywords for different content items;
  the geographic matching engine to perform operations comprising:
    obtaining geographies associated with the computing device and associated with the content items that can be provided to computing devices; and
    identifying geographic matches between the computing device and at least some of the content items;
  the auction engine to perform operations comprising:
    including, in an auction, content items having matching scores that exceed a threshold and that match a geography of the computing device, the auction for receiving bids from content providers to determine which of the content items in the auction to output in response to the input query;
  the geographic matching engine to perform operations comprising:
    determining, based at least in part on bids provided in the auction, candidate content items for output in response to the input query;
    obtaining geographic areas associated with the candidate content items; and
    selecting a candidate content item having a smallest geographic area; and
  an output engine to perform operation comprising outputting the selected candidate content item in response to the input query.

18. The system of claim 17, wherein matching scores of the candidate content items are within a predefined tolerance of each other, and bids associated with the candidate content items are within a predefined tolerance of each other.

19. The system of claim 17, wherein at least one of the following is true: matching scores of the candidate content items are equal, and bids associated with the candidate content items are equal.

20. The system of claim 17, wherein a geographic area of a first candidate content item is larger than the geographic area of a second candidate content item, the second candidate content item being the selected candidate.

\* \* \* \* \*